Aug. 8, 1961   E. W. CASSADAY ET AL   2,995,012
SERVO SYSTEM

Filed March 18, 1960   3 Sheets-Sheet 1

INVENTOR.
ERNEST W. CASSADAY,
CHARLES F. HAMMOND, AND
BY DAVID C. SHROPSHIRE

Schley, Trask & Jenkins
ATTORNEYS.

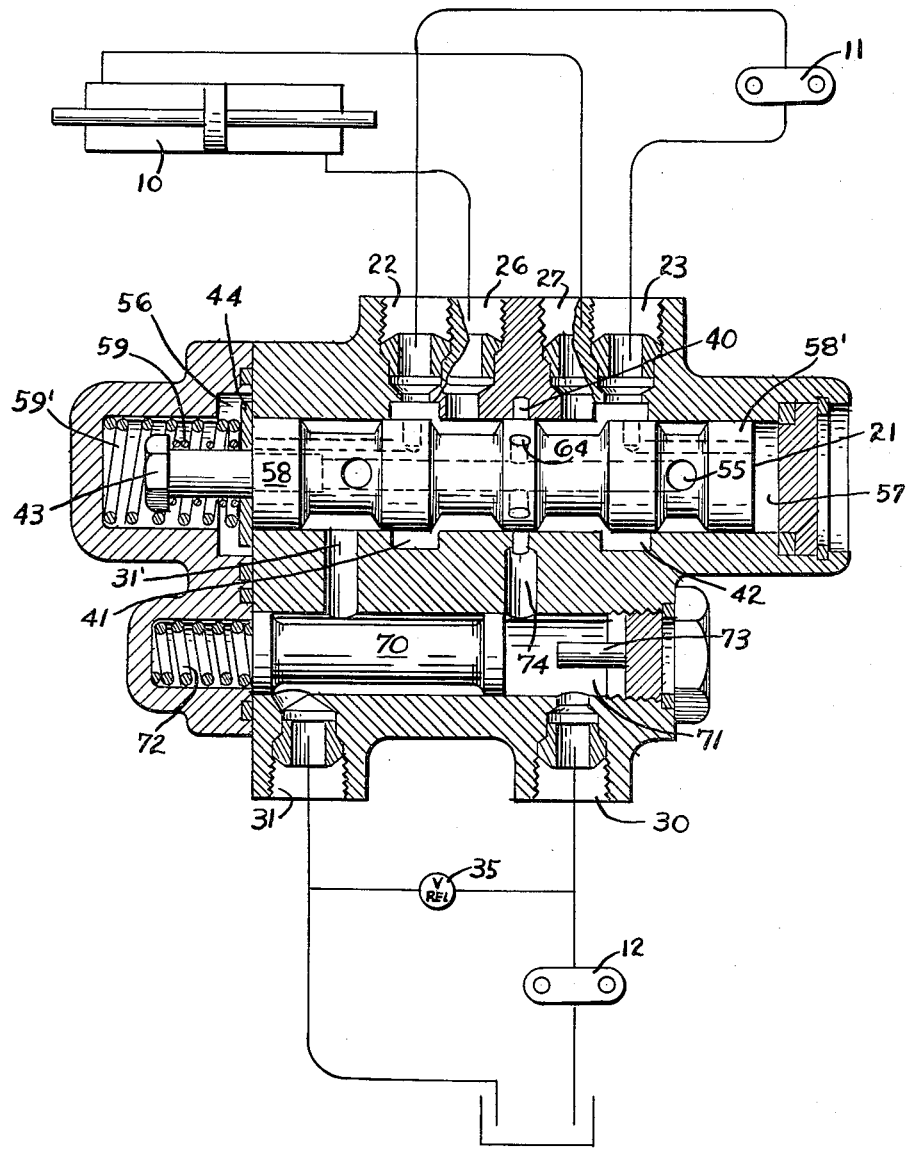

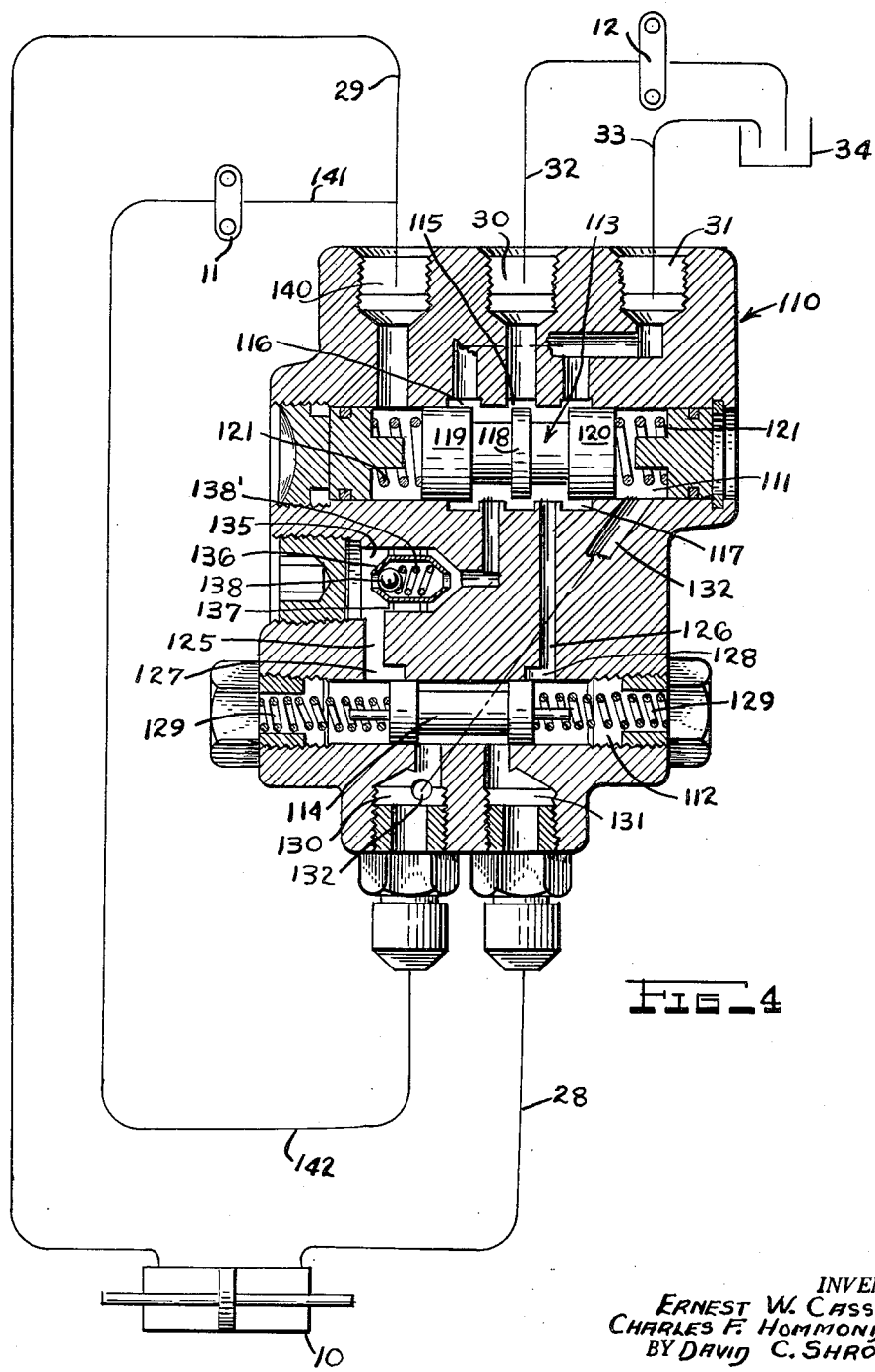
Fig_4

# United States Patent Office 2,995,012
Patented Aug. 8, 1961

2,995,012
SERVO SYSTEM
Ernest W. Cassaday, Lafayette, Ind., Charles F. Hammond, Detroit, Mich., and David C. Shropshire, Lafayette, Ind., assignors to Ross Gear and Tool Company, Inc., Lafayette, Ind., a corporation of Indiana
Filed Mar. 18, 1960, Ser. No. 15,986
10 Claims. (Cl. 60—52)

This invention relates to hydraulic servo systems, and particularly to such systems in which an operative connection of hydraulic nature is provided between the control or input member and the valve which regulates the flow of pressure fluid to the motor of the system. A system adapted for incorporation of the invention embodies a reversible control pump of positive displacement, or at least low-leakage type, a power-driven pump, a reversible hydraulic motor, and a valve having a valving element movable in both directions from a neutral position. The two ports of the control pump are connected to the valve, which is so constructed that the valving element is controlled by differences of pressure in the two lines connecting the control pump and the valve; and whenever the difference in pressure in those two lines exceeds a predetermined maximum, the valving element shifts to cause flow of liquid from the power-operated pump to the motor. The connections are so arranged that in either shifted position of the valving element liquid displaced between the power-driven pump and the motor flows through the control pump, which therefore serves as a metering device controlling the rate of response of the motor. Depending upon the valve construction and the arrangement of connections, when liquid is being displaced between the power-operated pump and the motor the control pump may be either in the pressure line or in the return line during operation of the system in both directions, or it may be in the pressure line during operation of the system in one direction and in the return line during operation in the other direction. In any of such three types of systems, the control pump may be employed to operate the motor directly in the event of failure of the power driven pump.

In its preferred form, a system employing our invention is reversible in the sense that the motor and control pump are always interconnected so that load on the motor is transmitted at least in part to the control pump. Preloaded valve-centering means make it possible for the control pump to operate the motor without assistance from the power driven pump until the load on the motor exceeds a predetermined maximum. A check-valve arrangement insures a minimum pressure in the system under power operation and prevents the creation of excessive vacuum when the system is being operated manually, as in the event of failure of the power-driven pump.

Further features of the invention will become apparent from the following more detailed description and from the accompanying drawings, in which:

FIG. 3 is a sectional view of a valve and its connections in a system wherein the control pump is always in the return line; and FIG. 4 is a sectional view of an open-center valve and its connections in a system wherein the control pump is in the pressure line during operation of the system in one direction and in the return line during operation in the other direction.

Figure 1:
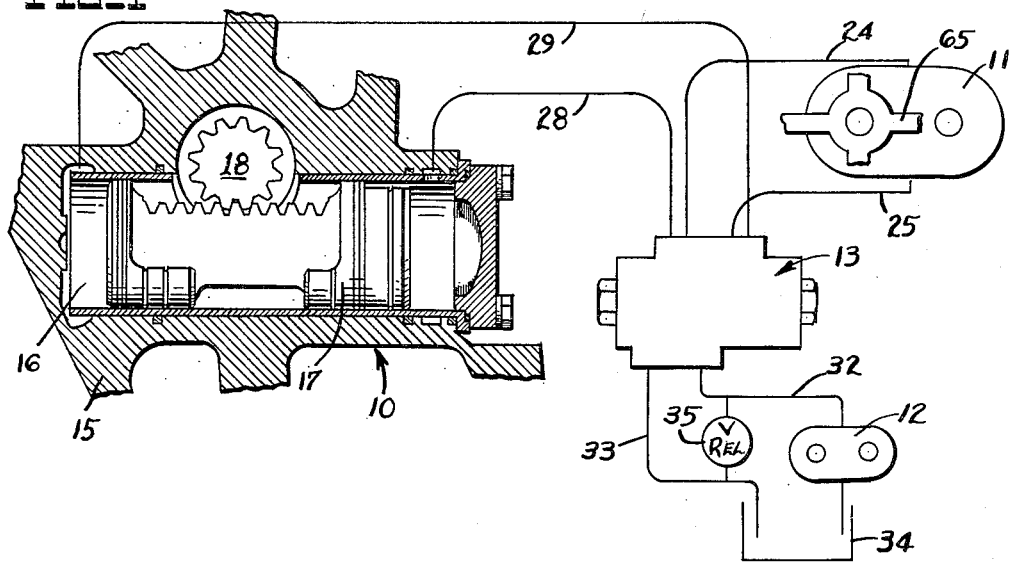
FIG. 1 is a somewhat diagrammatic view illustrating a complete servo system wherein the control pump is always in the pressure line between the power-operated pump and the motor.

The servo system illustrated in FIG. 1 embodies a reversible hydraulic motor 10, a control or input pump 11, a power driven pump 12, and a valve 13. The motor 10 shown is that of a power steering gear and comprises a housing 15 provided with a cylinder 16 which slidably receives a piston 17. A rock shaft 18 mounted in the housing and adapted for connection to the part or parts to be steered is operatively connected to the piston 17, as through the rack and pinion illustrated.

The valve 13 comprises a housing 20 having a bore which slidably receives a valving member or spool 21. The housing 20 also has a pair of control ports 22 and 23 connected through conduits 24 and 25 with the ports of the control pump 11. A pair of motor ports 26 and 27 are connected through conduits 28 and 29 with the opposite ends of the cylinder 16 of motor 10. In addition to the control and motor ports, the valve housing has a pressure port 30 and a return port 31 connected respectively through conduits 32 and 33 with the outlet and inlet of the power-driven pump 12. In the particular arrangement shown in FIG. 1, the conduit 33 discharges into a sump 34 from which the pump 12 draws liquid and the conduit 32 is connected to the conduit 33 through a pressure-relief or unloading valve 35.

The bore of the housing 20 is provided with a central annular groove 40 and a pair of outer grooves 41 and 42 located on opposite sides of the groove 40 and axially spaced therefrom and communicating respectively with the motor ports 26 and 27. The valve spool 21 has a central land 45 associated with and somewhat wider than the central housing groove 40, a pair of intermediate lands 51 and 52 associated respectively with and conveniently of about the same width as the housing grooves 41 and 42, and end lands 53 and 54. The space between the lands 45 and 51 communicates with the control port 22 while the space between lands 45 and 52 communicates with the control port 23. The return port 31 communicates through a passage 31' with the space between lands 51 and 53, and such space is connected by an axial passage 55 in the spool 21 with the space between the lands 52 and 54.

The ends of the housing bore are closed in any convenient manner to provide pressure chambers 56 and 57 in which, respectively, the ends of the spool 21 are exposed. A passage 58 in the spool 21 connects the chamber 56 with the space between lands 45 and 52, while a similar passage 58' in the spool connects the chamber 57 with the space between lands 45 and 51. Desirably, some form of preloaded spring arrangement resiliently holds the spool 21 in neutral position and biases it toward neutral position when it is displaced therefrom. As shown, the valve 21 is provided at one end with a headed extension 43 of reduced diameter which supports a washer 44. Such washer is slidable on the extension and is urged toward engagement with the adjacent end of the body of valve 21 and with an outwardly presented shoulder on the valve housing by two springs 59 and 59', which react respectively against the head of the extension 43 and a stationary shoulder. The valve 21 can be displaced to the left only by an effort great enough to overcome spring 59' and to the right only by an effort great enough to overcome spring 59. The two springs are preloaded, thus insuring that the valve 21 will remain in centered or neutral position until the differential in pressures within chambers 56 and 57 reaches a predetermined value.

The passage 31' associated with the return port 31 desirably contains a spring-loaded check 61 opening from the housing bore toward the port 31; and, for a purpose which will become apparent hereinafter, the valve 61 may contain a check valve 62 opening in the opposite direction to permit flow from the return line 33 to the housing-bore. Inwardly from the check valve 61, the passage 31′ communicates with the pressure port 30 and the groove 40 through a check valve 63 opening toward such port and groove.

The several lands of the spool 21 and the annular grooves and ports in the housing 20 are shown as so proportioned and disposed that in the neutral position of the spool the central groove 40 is occluded by the wider land 45, while the lands 51 and 52 are displaced outwardly from coplanar relationship respectively with the grooves 41 and 42 to connect control port 22 to motor port 26 and control port 23 to motor port 27. When the spool 21 is shifted to its leftward limit of movement, the land 52 closes communication between the control port 23 and the groove 42, the land 45 uncovers the center groove 40 to connect that groove to the control port 23 while still blocking communication of the center groove 40 with the control port 22 and groove 41, the latter port and groove remain interconnected, and the passage 31′ remains in communication with the space between lands 51 and 53. The housing 20 and spool 21 are essentially symmetrical about their respective transverse medial planes, and it is therefore unnecessary to describe the valving changes which occur as the result of movement of the spool to its rightward limit of movement.

The control pump 11 may be operated in any desired manner. In the steering gear illustrated in FIGS. 1 and 2, such pump is shown as a gear pump operated by a steering wheel 65. Turned in a clockwise direction, the steering wheel causes the pump 11 to withdraw liquid from the housing 20 through the port 23 and conduit 25 and to deliver liquid to the opposite end of the housing through the conduit 24 and port 22. Operated in the opposite direction, the pump withdraws liquid through port 22 and delivers liquid to port 23.

The valve 13 as so far described is of the closed center type, since in the neutral position of the valve spool 21 the groove 40 is occluded by the land 45 and flow from the pressure port 30 to the return port is prevented by the check valve 63, thus compelling liquid delivered by the power-driven pump 12 to pass through the pressure-relief valve 34 to return. However, by providing the valve spool with one or more radial passages 64 communicating with the axial passage 55 and opening in the annular face of the land 45 centrally thereof, the valve may be converted into one of the open-center type. When the passages 64 are provided and the valve is in neutral position, pressure liquid admitted through port 30 flows through the passages 64 and 55 into the space between lands 41 and 53 and thence by way of passage 31′ past check valve 61 to the return line 33.

Figure 2:
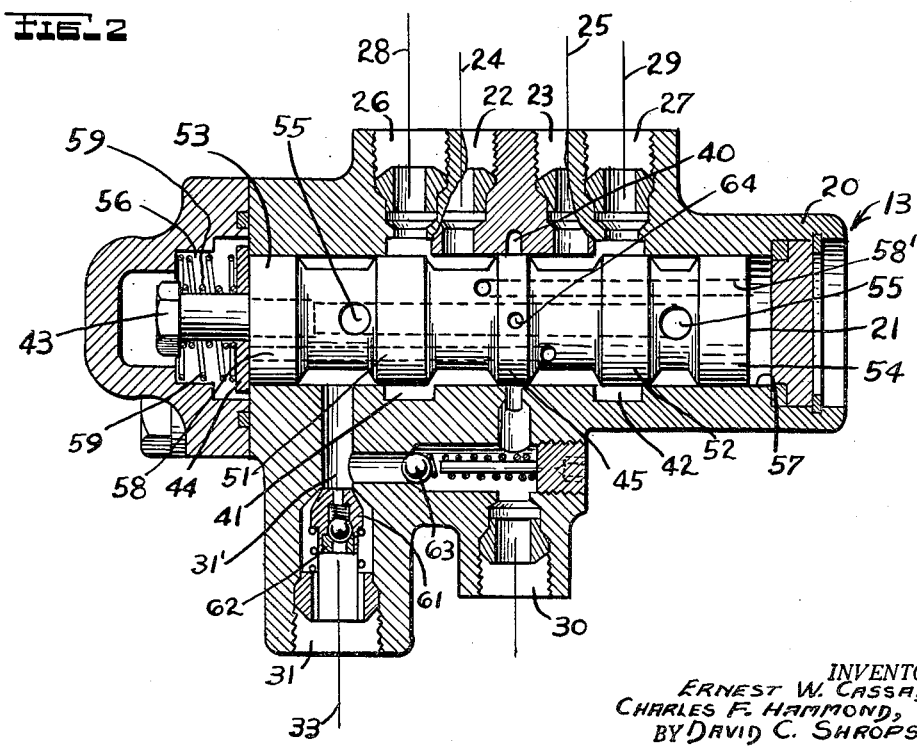
FIG. 2 is a sectional view of the valve employed in the system of FIG. 1.

When the pump 11 is not being operated, the valve spool 21 occupies its neutral position as shown in FIG. 2; and, if the passages 64 are provided, liquid delivered by the power driven pump circulates over the path last described without effect on the motor 10. Application of steering effort, say in the clockwise direction, to the steering wheel 65, will increase static pressure in the conduits 24 and 28, in the right-hand end of the motor cylinder 16, and in the space within the valve housing between the spool lands 45 and 51, and will decrease static pressure in the conduits 25 and 29, in the left-hand end of cylinder 16, and in the space between the spool-lands 45 and 52. Static pressure in the space between the lands 45 and 51 is transmitted to the chamber 57 through passage 58′ while the passage 58 transmits pressure to the chamber 56 from the space between the lands 45 and 52. The differential in pressures created by the application of a clockwise effort to the steering wheel 65 and transmitted to the chambers 56 and 57 urges the valve spool 21 toward the left in opposition to the effort exerted by the spring centering means 60. If the maximum pressure differential which can exist without movement of the valve spool 21 from neutral position is great enough to overcome the load on the motor 10, the motor will operate under the manual effort applied to the steering wheel, liquid flowing from the left-hand end of the motor cylinder 16 through conduits 29 and 25 to the control pump 11 and from the latter, through conduits 24 and 28 to the right-hand end of cylinder 16.

If the load on the motor 10 is greater than that which can be overcome under the conditions just described, the pressure differential created by the control pump 11 will increase until it becomes sufficient to overcome the centering means 60, whereupon the valve spool 21 will move to the left, carrying the passages 64 (if present) beyond the groove 40, opening communication between that groove and control port 27, blocking communication between ports 23 and 27 and opening communication between port 27 and the right-hand end of the passage 55 in the valve spool. Pressure liquid from pump 12 will now flow to the right-hand end of the motor cylinder by way of conduit 32, pressure port 31, control port 23, control pump 11, ports 22 and 26, and conduit 28, and liquid displaced from the left-hand end of such cylinder will be returned to the sump 34 by way of conduit 29, port 27, passages 45 and 31′, port 31, and conduit 33. This condition will continue as long as the effort applied to the steering wheel is sufficient to create the pressure differential necessary to hold the spool 21 in its rightward position; and as soon as the steering wheel is relieved of such effort, the spool returns to its neutral position and the delivery of pressure liquid from the pump 12 to the motor terminates.

Operation of the system under the application of counterclockwise effort to the steering wheel corresponds to that above described except that the pressure-differential created by operation of the control pump urges the valve spool 21 toward the right and the liquid displacement occurring moves the motor piston 17 to the right.

If the power-operated pump 12 fails for any reason, the system is operative under manual effort. If the manual effort required to overcome load on the motor is insufficient to displace the spool 21 from neutral position, the system operates as it would under a similar condition but with the pump 12 operating. If the load on the motor 10 is so great that the manually applied effort creates a pressure differential sufficient to displace the valve spool, say to the left, liquid will continue to be displaced from the control pump 11 through conduits 24 and 28 to the motor, and liquid will continue to return from the motor to the valve housing 20 through conduit 29 and port 27; but within the valve housing, returned liquid will flow by way of passages 55 and 31′, past check valve 63 to groove 40 and thence to port 23 for return to pump 11. In the reverse operation, with the spool 21 displaced to the right, liquid will flow from the pump 11 to the motor by way of ports 23 and 27 and from the motor to pump 11 by way of port 26 and passage 31′, past check valve 63, and through groove 40 and port 22.

In operation of the system with the power driven pump 12 not functioning, the check valve 62, by permitting the admission of liquid from the return conduit 33, serves to prevent the creation of a vacuum in the path of flow of liquid returning from the motor to pump 11.

In the system shown in FIG. 3, the control pump 11, instead of being located in the pressure line between the control valve and the motor, is located in the return line between the motor and the control valve. The control valve of FIG. 3 is essentially the same as that of FIG. 2 except for a reversal in the positions of the control ports and motor ports and for a rearrangement of the spool-passages 58 and 59 through which pressure is transmitted to the chambers 56 and 57. In addition, the check valves 61 and 63 are eliminated and a blocking valve is incorporated. Such blocking valve comprises a spool 70 axially slidable in a bore 71 provided in the valve housing 20′. The pressure and return ports communicate with the bore 71 at points spaced apart axially by distance somewhat greater than the length of the spool 70. A spring 72 acts on the spool 70 to urge it axially toward that end of the bore 71 adjacent which the pressure port 30 is located, and an abutment 73 limits movement of the spool under the influence of the spring 72 to a position in which it lies between the ports 30 and 31. In this position, an external annular groove in the spool provides communication between the passage 31' and a passage 74 leading from the bore 71 to the groove 40. When the power driven pump 12 is operating, pressure at the pressure port 30 and in the right-hand end of the bore 71 forces the spool 70 leftwardly into the position shown in FIG. 3 to block communication between passages 31' and 74 and connect passage 31' to the return port 31 and passage 74 to the pressure port 30.

Under the above mentioned rearrangement of the passages 58 and 58', the passage 58 leading from chamber 56 opens in the annular face of land 51 in a position such that it always remains in communication with the groove 41. In similar fashion, the passage 58' opens in land 52 for communication with the groove 42.

Since, in the valve of FIG. 3, the positions of the control and motor ports are interchanged, the control ports 22 and 23 communicate respectively with the grooves 41 and 42 while the motor ports 26 communicate with the spaces to the left and right of the center land 45.

If the control valve of FIG. 3 is of the open-center type—i.e., if the spool 21 has the radial passages 64 on the land 45—liquid delivered to pressure port 30 from the pump 12 when the spool 21 is in neutral position forces the spool 70 to the left and flows through passages 64, 55, and 31' to port 31 for return to the sump. If the passages 64 are absent, discharge pressure forces the spool 70 to the left; but since there is no outlet for liquid from groove 40, the liquid delivered by the pump is compelled to flow through the pressure-relief valve 35.

If, with the power driven pump 12 operating, the control pump is operated, say to withdraw liquid from port 23 and deliver liquid to port 22, the increased pressure at port 22 and the decreased pressure at port 23 will be transmitted to the chambers 56 and 57 respectively, and the valve spool 21 will be urged to the right to connect groove 40 with port 26 and port 22 with passage 31', and to block communication between ports 22 and 26 while leaving ports 23 and 27 interconnected. In such circumstances, pressure liquid will flow from port 30 through passage 74 and port 26 to the right hand end of the motor, while liquid returned from the left hand end of the motor will flow by way of ports 27 and 23, through the control pump 11 and thence by way of port 22 and passage 31' to the return conduit. Operation of the control pump in the opposite direction will move the spool 21 to the left, pressure liquid will flow by way of groove 40 and port 27 to the left-hand end of the motor, and liquid returned from the other end of the motor will pass through ports 26 and 22, the control pump 11, port 23, and passages 55 and 31' to return.

Should the power driven pump 12 of the system of FIG. 3 fail, the spring 72 will force the spool 70 rightwardly against abutment 73, thus blocking port 30 from passage 74 and port 31 from passage 31' while interconnecting passages 31' and 74. In this condition, if the control pump 11 is operated to withdraw liquid from control port 23 and deliver liquid to control port 22, the spool 21 will be urged to the right to permit liquid delivered to port 23 to flow to the right-hand end of the motor 10 via passage 31', the groove in spool 70, passage 74 and port 26 and liquid returned from the motor to reach the pump 11 via interconnected ports 27 and 23. If spool 21 is displaced to the left with the pump 12 out of operation, liquid can flow from pump 11 through port 23, spool-passage 55, passages 31' and 74, and port 27 to the left-hand end of motor 10, while liquid displaced from the opposite end of the motor returns to the control pump via the interconnected ports 26 and 22.

As in the case of the system of FIGS. 1 and 2, the spool 21 of FIG. 3 remains in neutral position until the pressure differential in chambers 56 and 57 becomes great enough to displace the spool against the bias imposed by the spring means 60. If the load on the motor 10 is light enough that it can be overcome without creating the differential pressure necessary to displace the spool 21 from neutral position, liquid flow in one direction is confined to conduit 24, ports 22 and 26, and conduit 28 and in the other direction to conduit 25, ports 23 and 27, and conduit 29.

Both of the systems so far described are reversible in the sense that the motor can yield under load by displacing liquid through the control pump 11. Although this is the preferred arrangement, either system can readily be rendered irreversible merely by widening the lands 51 and 52 to an extent such that, in the neutral position of the spool 21, they lap the inner edges of the respectively associated grooves 41 and 42. With the lands so widened, there would be no communication between ports 22 and 26 or between ports 23 and 27 until the spool was shifted from neutral position; and since the inner ends of the spool passages 58 and 59 would not communicate with the motor ports, pressure changes in the motor could not produce in the chambers 56 and 57 the pressure differential through which alone the spool 21 can be shifted. As a result, the piston of the motor would be hydraulically locked in fixed position whenever the spool 21 was in its neutral position. The inner ends of the passages 58 and 59, however, would still communicate with the control ports, so that operation of the control pump could produce the differential pressures necessary to shift the spool 21 and cause operation in a manner above described.

The system shown in FIG. 4 differs from any of the other systems described in that the control pump is located in the pressure line to the motor under operation of the system in one direction but in the return line from the motor when the system is operating in the other direction. The valve employed in this system has a body 110 provided with two bores 111 and 112 which respectively receive a main valve spool 113 and an auxiliary valve spool 114. The bore 111 has a center annular groove 115 communicating with the pressure port 30 and two outer grooves 116 and 117 both of which communicate with the return port 31. The main valve spool has a center land 118 and end lands 119 and 120. In the neutral position of spool 113, the center land 118, which is narrower than the groove 115, is coplanar with such groove, and the end lands 119 and 120 only partially overlap the grooves 116 and 117 to provide communication of the outer groove with both end grooves. Springs 121, acting oppositely on the spool 113, bias it toward its neutral position.

The valve body 110 is provided internally with two passages 125 and 126 which open into the bore 111 on opposite sides of the lands 116 and into the bore 112 through axially spaced ports 127 and 128. The valve spool 114 has a groove which, in the centered position toward which the spool is biased by opposed springs 129, interconnects two exterior ports 130 and 131, while lands at the ends of spool 114 block communication between those ports and the internal ports 127 and 128. The port 130 is connected by a passage 132 with the bore 111 at a point therein to the right of the end land 120 of spool 113.

The valve body 110 is provided with a recess 135 which, in effect, forms an enlarged portion of the passage 125. Disposed in such recess is a valve shell 136 which is of smaller diameter than the recess but which is provided exteriorly with fingers 137 supporting the shell concentrically in the recess while allowing liquid to flow axially in the space surrounding it. The shell 136 opens at its ends to the passage 125 and contains a check valve 138 permitting flow from bore 112 to bore 111 and urged toward closed position in the shell by a spring 138'. The shell is freely slidable in the recess 135 and its inner end is formed complementarily to the bottom of the recess to seat thereagainst.

As in the systems of FIGS. 2 and 3, the power driven pump 12 delivers liquid to the pressure port 30 through conduit 32, and liquid returned from return port 31 passes through conduit 33 to the sump 34. One of the motor conduits, shown as conduit 28, is connected to the port 131 and the other to an external valve-body port 140 which communicates with the bore 111 to the left of spool-land 119. The control pump 11 is connected between ports 130 and 140 by conduits 141 and 142.

The system of FIG. 4 functions as follows: With the control pump 11 at rest and the power-driven pump 12 operating, the main valve spool 113 will be centered and the pump 12 will deliver liquid from the sump to the central groove 115 of the valve bore 111. From the groove 115, the liquid divides and flows by way of grooves 116 and 117 to the return port 31 whence it returns to the sump 34 through conduit 33. Since the two paths over which the divided liquid flows from the groove 115 are essentially identical, equal pressures will exist at the upper ends of passages 125 and 126 and will be transmitted through those passages to opposite ends of the bore 112 with the result that the spool 114 will be centered to interconnect the exterior ports 130 and 131. If the pump 11 is operated, say in a direction to withdraw liquid through the conduit 29 from the left-hand end of the motor 10, such liquid will tend to flow to the right-hand end of the motor by way of conduit 142, ports 130 and 131, and conduit 28. Such operation of the control pump 11 will produce a reduction of pressure at port 140 and in the left-hand end of bore 111 and an increase of pressure at the port 130, and the latter pressure charge will be transmitted to the right-hand end of bore 111 through passage 132. As a result of the pressure charges at opposite ends of the bore 111, valve spool 113 will shift to the left choking and eventually blocking communication of the groove 115 with the grooves 116 and 117 and with passage 125. However, even in the extreme leftward position of the spool 113, communication of the groove 115 with passage 126 will remain open. Accordingly, pressure liquid will be delivered through passage 126 to move the valve spool 114 to the left and connect the passage 126 to port 131 through which and conduit 28 the pressure liquid will flow to the motor 10. The leftward shift of spool 114 interconnects ports 127 and 130, thereby making it possible for liquid returned from the motor through conduit 29 to pass through the control pump 11, conduit 142, passage 125, and groove 116 to port 31 and conduit 33 for return to the sump 34. In flowing through passage 125, the returning liquid forces the valve-shell 136 against its seat at the bottom of recess 135, and the returning liquid flows through the shell 136 by displacing the check valve 138 against the spring 138'. The pressure-drop across the check valve 138 makes it possible for the control pump 11 to maintain in the opposite ends of the bore 111 the pressure differential necessary to maintain the main valve spool 113 in its leftward position.

If, with the valve spools 113 and 114 centered, the pump 11 is operated in the reverse direction—i.e., in a direction to displace liquid from port 130 toward motor conduit 29, the pressure reduction at port 130 will be transmitted through passage 132 to the right-hand end of bore 111 and the pressure increase in conduit 29 will be transmitted through port 140 to the left-hand end of such bore with the result that the spool 113 will be shifted to the right. The rightward shift of the spool closes communication of the groove 115 with the grooves 116 and 117 and the passage 126 and thus directs into passage 125 the pressure liquid entering port 30. Such liquid displaces the shell 136 from its seat at the bottom of recess 135 and flows around the shell into the left-hand end of bore 112, where it forces spool 114 to the right to connect port 127 with port 130 and port 128 with port 131. Continuing through port 130, the pressure liquid passes through the control pump 11 and conduit 29 to the motor. Liquid return from the motor through conduit 28 passes into return conduit 33 by way of ports 131 and 128, passage 126, groove 117 and port 131.

In the event of failure of the power-driven pump 12 in the system of FIG. 4, operation of the control pump 11 can result in no pressure differential in opposite ends of the bore 112 and the spool 114 therein remains centered interconnecting conduits 142 and 28 to provide a closed circuit between the pump 11 and the motor 10 and making possible operation of the motor 10 under effort applied to the control pump.

It will be noted that in all systems described, the motor and the control pump are always interconnected, whereby the load on the motor is always transmitted at least in part to the control pump and no displacement of the motor pump can occur without an accompanying displacement of the control pump. The preloaded centering springs 59 and 59' of FIGS. 2 and 3 make it possible, under light loading of the motor, for the motor to be displaced under manual operation of the control pump; and the fact that the control pump will be applying a substantial effort to the motor before the valve shifts to admit pressure liquid, promotes smoothness in the transition from manual to power actuation of the motor.

The check valves 61 of FIG. 2 and 136 of FIG. 4 serve to maintain a minimum pressure in the return line under power operation, thus preventing the creation of a vacuum in the system such as might occur if the control pump should be operated too rapidly. Under manual operation, pressure in the return line might drop below atmospheric; and in such a condition, the check valve 62 of FIG. 2 will limit the vacuum created and permit liquid to be drawn into the system, if necessary, from the return line to the sump. To insure the presence of liquid in the return line for that purpose, the sump may be elevated, as in FIG. 4; but ordinarily the return line will remain full at all times if it discharges below the liquid level in the sump.

The control pump 11 may be of any desired type so long as it has a substantially positive displacement and a relatively smooth delivery. If a gear pump is used it is preferably of the type in which the gears are helical gears with the pitch so proportioned to the tooth-spacing that the delivery is free from the pulsing which characterizes spur-gear pumps. Systems of the type above described are so sensitive that the pulsing in the delivery of a spur gear pump will cause oscillation of the movable control-valve member which, in turn, will produce an undesirable oscillation in the motor. This can be eliminated by using a control pump embodying helical gears in which the pitch of the teeth, across the face of each gear, is substantially equal to the tooth spacing or to an integral multiple thereof.

It will be understood that the several embodiments of our invention illustrated and above described are set forth merely by way of example and that the invention is not limited to them. In this connnection, we note particularly that this invention is not limited to systems in which the pressure differential created by operation of the control pump is the sole agency employed to displace the main valve spool from neutral position.

We claim as our invention:
1. In a hydraulic servo system having a reversible hydraulic motor, a power driven pump, a reversible control pump, and valve means for controlling the flow of liquid between said pumps and said motor, said valve having a pair of motor ports connected to the motor, a pair of control ports connected to said control pump, a pressure port receiving liquid discharged from said power-driven pump, and a return port, said valve also having a valve member movable in opposite directions from a neutral position to control the interconnection of said ports, said valve member when in neutral position interconnect- ing said control ports respectively with said motor ports and blocking communication of those ports with said pressure and return ports whereby to permit the control pump to operate the motor, means responsive to the pressure differential resulting from operation of said control pump for urging said movable valve member from neutral positon, resilient centering means opposing displacement of said valve member from neutral position, said centering means being preloaded to maintain the valve member in neutral position until said pressure differential reaches or exceeds a predetermined value, said valve member when in displaced position interconnecting said ports to provide between said pressure and return ports a fluid circuit including the control pump and the motor whereby liquid displaced in operation of the motor will pass through the control pump.

2. In a hydraulic servo system having a reversible hydraulic motor, a power driven pump, a reversible control pump, and valve means for controlling the flow of liquid between said pumps and said motor, said valve having a pair of motor ports connected to the motor, a pair of control ports connected to said control pump, a pressure port receiving liquid discharged from said power-driven pump, and a return port, said valve also having a valve member movable in opposite directions from a neutral position to control the interconnection of said ports, said valve member when in neutral position interconnecting said control ports respectively with said motor ports and blocking communication of those ports with said pressure and return ports whereby to permit the control pump to operate the motor, means responsive to the pressure differential resulting from operation of said control pump for urging said movable valve member from neutral position, said valve member when in displaced position interconnecting said ports to provide between said pressure and return ports a fluid circuit including the control pump and the motor whereby liquid displaced in operation of the motor will pass through the control pump.

3. A servo system as set forth in claim 2 with the addition that in either displaced position of the valve member the control pump is connected between said pressure port and the motor.

4. A servo system as set forth in claim 2 with the addition that in either displaced position of the valve member the control pump is connected between said return port and the motor.

5. A servo system as set forth in claim 2 with the addition that the control pump is connected between the pressure port and the motor in one displaced position of the valve member and between the motor and return port in the other displaced position of the valve.

6. A servo system as set forth in claim 2 with the addition of a check valve permitting flow of liquid to said return port, said check valve being spring-loaded to insure the existence of a predetermined minimum pressure throughout said circuit.

7. A servo system as set forth in claim 2 with the addition of a return conduit connected to said return port to receive liquid therefrom, and a check valve permitting flow of liquid from said return conduit into said valve.

8. In a hydraulic servo system having a reversible hydraulic motor, a power driven pump, a reversible control pump, and valve means for controlling the flow of liquid between said pumps and said motor, said valve having a pair of motor ports connected to the motor, a pair of control ports connected to said control pump, a pressure port receiving liquid discharged from said power-driven pump, and a return port, said valve also having a valve member movable in opposite directions from a neutral position to control the interconnection of said ports, said valve member when in neutral position blocking communication of the motor ports and control ports with said pressure and return ports, means responsive to the pressure differential resulting from operation of said control pump for urging said movable valve member from neutral positon, resilient centering means opposing displacement of said valve member from neutral position, said centering means being preloaded to maintain the valve member in neutral position until said pressure differential reaches or exceeds a predetermined value, said valve member when in displaced position interconnecting said ports to provide between said pressure and return ports a fluid circuit including the control pump and the motor whereby liquid displaced in operation of the motor will pass through the control pump.

9. A servo system as set forth in claim 8 with the addition of a check valve permitting flow of liquid to said return port, said check valve being spring-loaded to insure the existence of a predetermined minimum pressure throughout said circuit.

10. In a hydraulic servo system having a reversible hydraulic motor, a power driven pump, a reversible control pump, and valve means for controlling the flow of liquid between said pumps and said motor, said valve having a pair of motor ports connected to the motor, a pair of control ports connected to said control pump, a pressure port receiving liquid discharged from said power-driven pump, and a return port, said valve also having a valve member movable in opposite directions from a neutral position to control the interconnection of said ports, said valve member when in neutral position blocking communication of the motor ports and control ports with said pressure and return ports, means responsive to the pressure differential resulting from operation of said control pump for urging said movable valve member from neutral position, said valve member when in displaced condition providing communication of said control ports respectively with said motor ports and establishing between said pressure and return ports a fluid circuit including the control pump and the motor whereby liquid displaced in operation of the motor will pass through the control pump, a return conduit connected to said return port to receive liquid therefrom, and a check valve permitting flow of liquid from said return conduit to said circuit.

References Cited in the file of this patent

UNITED STATES PATENTS

| | | |
|---|---|---|
| 2,020,951 | Lemon | Nov. 12, 1935 |
| 2,512,979 | Strother | June 27, 1950 |
| 2,836,960 | Wittren | June 3, 1958 |